United States Patent [19]

Harris

[11] Patent Number: 5,063,265

[45] Date of Patent: Nov. 5, 1991

[54] STABILIZED POLY(ARYL ETHER KETONE) COMPOSITIONS

[75] Inventor: James E. Harris, Piscataway, N.J.

[73] Assignee: Amoco Corporation, Chicago, Ill.

[21] Appl. No.: 460,404

[22] Filed: Jan. 3, 1990

Related U.S. Application Data

[63] Continuation of Ser. No. 189,390, May 2, 1988, abandoned.

[51] Int. Cl.$^5$ ............................ C08K 5/52; C08K 5/53
[52] U.S. Cl. .................................. 524/126; 524/128; 524/135; 524/145; 524/151; 524/153; 524/287; 524/310; 524/315; 524/321
[58] Field of Search ............... 524/126, 128, 135, 145, 524/151, 153, 125, 287, 310, 321

[56] References Cited

U.S. PATENT DOCUMENTS

| | | | |
|---|---|---|---|
| T948,008 | 7/1976 | Attwood et al. | 524/145 |
| 4,320,224 | 3/1982 | Rose et al. | 528/125 |
| 4,434,263 | 2/1984 | Blackwell | 524/322 |

FOREIGN PATENT DOCUMENTS 1446962  8/1976  United Kingdom .

Primary Examiner—Kriellion S. Morogan
Attorney, Agent, or Firm—Frederick S. Jerome; William H. Magidson; Ralph C. Medhurst

[57] ABSTRACT

Described herein are novel heat-stabilized poly(aryl ether ketone) compositions. Stability is imparted by blending a poly(aryl ether ketone) with an aromatic phosphorus compound and an organic acid having a dissociation constant within a well-defined range.

22 Claims, No Drawings

STABILIZED POLY(ARYL ETHER KETONE) COMPOSITIONS

FIELD OF THE INVENTION

This invention is directed to novel heat-stabilized poly(aryl ether ketone) compositions. These compositions display good thermal stability, for periods of up to 30 minutes, at temperatures of 360° to 430° C., which are required for their melt-fabrication. Stability is imparted by blending a poly(aryl ether ketone) with an aromatic phosphorus compound and an organic acid having a dissociation constant within a well-defined range.

BACKGROUND OF THE INVENTION

Poly(aryl ether ketones) are a known class of engineering polymers. Several poly(aryl ether ketones) are highly crystalline with melting points above 300° C. Two of these crystalline poly(aryl ether ketones) are commercially available and are of the following structure.

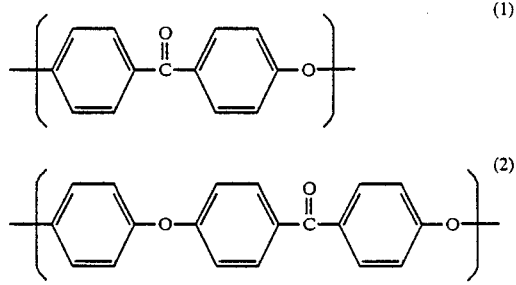

Over the years, there has been developed a substantial body of patent and other literature directed to formation and properties of poly(aryl ethers) (hereinafter called "PAE"). Some of the earliest work, such as by Bonner, U.S. Pat. No. 3,065,205, involves the electrophilic aromatic substitution (e.g., Friedel-Crafts catalyzed) reaction of aromatic diacyl-halides with unsubstituted aromatic compounds such as di-phenyl ether. The evolution of this class to a much broader range of PAE's was achieved by Johnson et al., Journal of Polymer Science, A-1, vol. 5, 1967, pp. 2415-2427; Johnson et al., U.S. Pat. Nos. 4,107,837 and 4,175,175. Johnson et al. show that a very broad range of PAE's can be formed by the nucleophilic aromatic substitution (condensation) reaction of an activated aromatic dihalide and an aromatic diol. By this method, Johnson et al. created a host of new PAE's including a broad class of poly(aryl ether ketones), hereinafter called "PAEK'S".

In recent years, there has developed a growing interest in PAEK's as evidenced by Dahl, U.S. Pat. No. 3,953,400; Dahl et al., U.S. Pat. No. 3,956,240; Dahl, U.S. Pat. No. 4,247,682; Rose et al., U.S. Pat. No. 4,320,224; Maresca, U.S. Pat. No. 4,339,568; Atwood et al., Polymer, 1981, vol. 22, August, pp. 1096-1103; Blundell et al., Polymer, 1983, vol. 24, August, pp. 953-958, Atwood et al., Polymer Preprints, 20, No. 1, April 1979, pp. 191-194; and Rueda et al., Polymer Communications, 1983, vol. 24, September, pp. 258-260. In early to mid-1970, Raychem Corp. commercially introduced a PAEK called Stilan ®, a polymer whose acronym is PEK, each ether and keto group being separated by 1,4-phenylene units. In 1978, Imperial Chemical Industries PLC (ICI) commercialized a PAEK under the trademark Victrex PEEK. As PAEK is the acronym of poly(aryl ether ketone), PEEK is the acronym of poly(ether ether ketone) in which the 1,4-phenylene units in the structure are assumed.

Thus, PAEK's are well known; they can be synthesized from a variety of starting materials; and they can be made with different melting temperatures and molecular weights. The PAEK's are crystalline, and as shown by the Dahl and Dahl et al. patents, suora, at sufficiently high molecular weights they can be tough, i.e., they exhibit high values ($>50$ ft-lbs/in$^2$) in the tensile impact test (ASTM D-1822). They have potential for a wide variety of uses, but because of the significant cost to manufacture them, they are expensive polymers. Their favorable properties class them in the upper bracket of engineering polymers.

PAEK's may be produced by the Friedel-Crafts catalyzed reaction of aromatic diacylhalides with unsubstituted aromatic compounds such as diphenyl ether as described in, for example, U.S. Pat. No. 3,065,205. These processes are generally inexpensive processes; however, the polymers produced by these processes have been stated by Dahl et al., supra, to be brittle and thermally unstable. The Dahl patents, supra, allegedly depict more expensive processes for making superior PAEK's by Friedel-Crafts catalysis. In contrast, PAEK's such as PEEK made by nucleophilic aromatic substitution reactions are produced from expensive starting fluoro monomers, and thus would be classed as expensive polymers.

These poly(aryl ether ketones) exhibit an excellent combination of properties; i.e., thermal and hydrolytic stability, high strength and toughness, wear and abrasion resistance and solvent resistance. Thus, articles molded from poly(aryl ether ketones) have utility where high performance is required.

As indicated earlier, poly(aryl ether ketones) are highly crystalline materials with melting points well above 300° C. They are melt-fabricated at temperatures that are at least 360° C.; more often, however, temperatures of 400° C. to 430° C. are required for successful molding or extrusion. Hence, if the full potential of this very unique class of polymers is to be realized, the poly(aryl ether ketone) melt must be stable at the above high temperatures for periods of up to 30 minutes.

Unstabilized PAEKs show a strong tendency to crosslink in the melt. The behavior is highly undesirable since it leads to degradation of polymer properties and an increase of its melt viscosity. As the exposure time in the melt lengthens, melt fabrication becomes progressively more difficult.

Attempts to melt-stabilize poly(aryl ether ketones) were made by others. Thus, U.S. Pat. No. 3,767,620 claims that PAEK's can be stabilized by treatment with a chemical reducing agent in an acidic environment. Representative reducing agents cited in the patent included primary and secondary alkanols in combination with hydrogen chloride; formic acid; and silanes, e.g., trialkylsilanes such as triethylsilane. Interestingly enough, the use of formic acid led, in our hands, to complete gellation of the polymer.

Inorganic stabilizers, e.g., amphoteric metal oxides ($\gamma$-Al$_2$O$_3$) or molecular sieves are described in U.S. Pat. Nos. 3,925,307 and 4,593,061. Along related lines, non-hydrolyzable divalent metal oxides or sulfides, such as zinc oxide or zinc sulfide, were shown to be good stabilizers for poly(aryl ether sulfones)—see U.S. Pat. No. 3,708,454.

British Patent No. 1,446,962 and U.S. Defensive Publication No. T 948,008 disclose the use of phosphorus containing stabilizers of the general formula (3); it

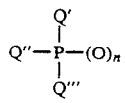
(3)

is indicated that the addition of from about 0.01 to about 4.0 percent by weight of (3) to a poly(aryl ether ketone) reduces the tendency of the melt viscosity of the polyketone to increase upon prolonged heating. In formula (3), n is 0 or 1 and each of Q′, Q″ and Q‴ is —R or —OR, where R is a monovalent hydrocarbon radical containing up to 20 carbon atoms. Our own investigation (see "Experimental") has shown that the use of some organic phosphorus compounds described by formula (3) has very little effect on the melt viscosity of PAEK's; in fact, in some instances (cf. phosphonites) a negative effect is observed, i.e., the viscosity actually increases. In other instances, phosphites did lead to improvements, but the latter were erratic.

THE INVENTION

It was unexpectedly discovered that the addition to a poly(aryl ether ketone) of an aromatic phosphorus compound, in conjunction with an organic acid having a dissociation constant in a well-defined range, yields compositions that are stable for periods of up to 30 minutes (and even longer) at temperatures of about 400° C.

The melt stability of the polymers was assessed using the well-known melt-flow or melt index determination at 400° C. and 44 psi (IP) pressure. The tests were conducted according to ASTM D-1238; the technique is described in more detail in the "Experimental". Each test consisted of two determinations and yielded two data points, $MF_1$ and $MF_2$ which reflected the melt viscosities of the product at those points in time. The melt-flow $MF_1$, measured after ten minutes at 400° C., yielded information about the stability of the sample during those first ten minutes of heating. As discussed previously, unstabilized materials tend to yield very low $MF_1$ values indicative of crosslinking. After an additional 20 minutes exposure to 400° C. (total heating time = 30 minutes) the value of $MF_2$ was obtained. The ratio of $MF_2$ to $MF_1$ (referred to as MFR) indicated whether any degradation (MFR > 1.0) or crosslinking (MFR > 1.0) took place during the 20 minute interval. Stable materials showed large $MF_1$ values and MFR's very close to 1.0.

The stabilizing effect of the combination of an aromatic phosphorus compound with an organic acid was surprising. Indeed, the performance of phosphorus compounds (3) and of formic acid were already discussed. The addition of an organic phosphorus compound in conjunction with an organic acid results in a very significant reduction in melt viscosity, even where the phosphorus compound alone has a detrimental effect. Of course, if the phosphorus compound per se is also effective, significantly improved results are obtained upon addition of the acid. In another surprising feature, oxalic and acetic acids (both useful in this invention) decreased polymer stability when used by themselves (Table IV, "Experimental"). However, an improvement was observed when these acids were combined with an aromatic phosphorus compound.

The aromatic phosphorus compounds are used in amounts of from about 0.25 to about 3.0 percent by weight based on the polymer. Amounts in the range of from about 0.25 to about 1.0 percent by weight are preferred. Best results are obtained when the weight of the organic acid employed is equal to the weight of the aromatic phosphorous compounds. However, lower and higher amounts are also useful.

The novel, thermally stable compositions of the instant invention, are thus comprised of (a) a poly(aryl ether ketone) polymer, (b) an aromatic phosphorus compound as defined below, and (c) an organic acid having a dissociation constant within a well-defined range;

the compounds (a), (b), and (c) being used in amounts indicated above.

The aromatic phosphorus compounds useful for the purposes of the instant invention are of the formulae

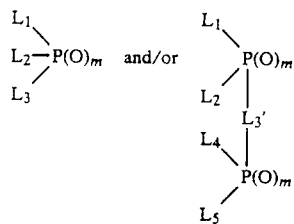

In the formulae above $L_1$, $L_2$, $L_3$, $L_4$, and $L_5$ may be the same or different, and are independently either $Ar_1$ or $Ar_1O$, where $Ar_1$ is a monovalent aromatic radical having at least six carbon atoms. The group $L'_3$ is of the formula $Ar_2$ or $OAr_2O$, where $Ar_2$ is an arylene radical having at least six carbon atoms, m is an integer and is 0 or 1.

Aromatic phosphites and phosphonites are the preferred phosphorus compounds.

They are of the following formula:

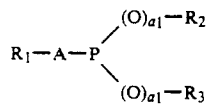

wherein $R_1$, $R_2$ and $R_3$ can be the same or different and are independently straight chain or branched chain alkyl radicals containing from 1 to about 25 carbon atoms, or substituted or unsubstituted aryl radicals containing from 6 to about 30 carbon atoms; $a_1$ is 1 or zero, with the proviso that both $a_1$'s are 1 when A is a chemical bond and only one $a_1$ can be zero when A is oxygen; A is a chemical bond or an oxygen atom; at least one of $R_1$, $R_2$ and $R_3$ must be an aromatic group.

The preferred alkyl radicals are those containing from about 5 to about 20 carbon atoms; most preferred alkyl groups contain from about 8 to about 18 carbon atoms.

The aryl radicals are preferably selected from the following formulae:

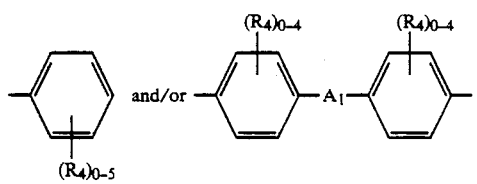

wherein $A_1$ is a direct bond, S, $SO_2$, O, CO, alkylene or alkylidene containing from about 1 to about 8 carbon atoms, and $R_4$ is independently an alkyl group of about 1 to about 6 carbon atoms or a halogen atom.

The following alkyl and aryl radicals are most preferred: octyl; nonyl; decyl; dodecyl,

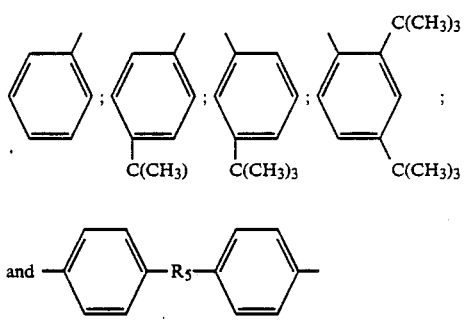

wherein $R_5$ is a direct bond O, CO, S, $SO_2$ or $C(CH_3)_2$.

The preferred phosphites include diphenyl phosphite and tris(2,4-di-tert-butyl phenyl) phosphite having the following formula (the latter being available commercially under the tradename of Mark 2112):

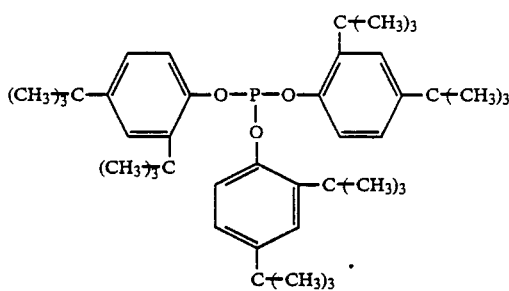

The diphosphites and/or diphosphonites are of the following formula:

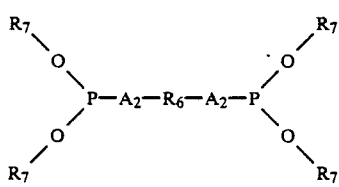

wherein $A_2$ is O or a chemical bond; $R_6$ is an aromatic radical and the $R_7$'s are independently aliphatic or aromatic radicals.

Preferably, the diphosphites and/or diphosphonites are of the following formula:

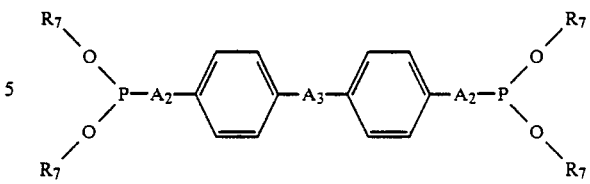

wherein $A_2$ is as defined above, $A_3$ is a chemical bond, S, $SO_2$, O, CO, alkylene or alkylidene containing from 1 to about 8 carbon atoms and the $R_7$'s are independently aliphatic radicals containing from 1 to about 25 carbon atoms, or substituted or unsubstituted aromatic radicals of from 6 to about 30 carbon atoms. $R_7$ is preferably selected from the following: methyl, ethyl, isopropyl, butyl, isobutyl, t-butyl, phenyl, alkyl or aryl substituted phenyl (wherein the alkyl group may contain from 1 to about 25 carbon atoms and may be linear or branched and the aryl group may contain from 6 to about 30 carbon atoms), halogen substituted phenyl, hydroxy substituted $C_6$ to $C_{30}$ aryl, naphthyl, $C_1$ to $C_{25}$ alkyl or $C_6$ to $C_{30}$ aryl substituted naphthyl, halogen substituted naphthyl, and the like.

The preferred $R_7$ groups can be represented as:

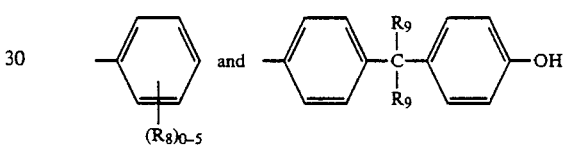

wherein $R_8$ is independently an alkyl group of 1 to about 6 carbon atoms and the $R_9$'s are independently alkyl groups of 1 to about 6 carbon atoms.

A preferred disphosphonite is tetrakis [2,4-di-tert-butyl-phenyl]-4,4'-biphenylene diphosphonite and has the following formula:

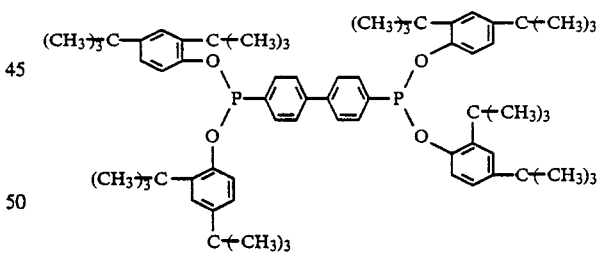

Such material is commercially available under the designation Sandostab P-EPQ (sold by the Sandoz Corporation).

Preferred diphosphites have the following formula:

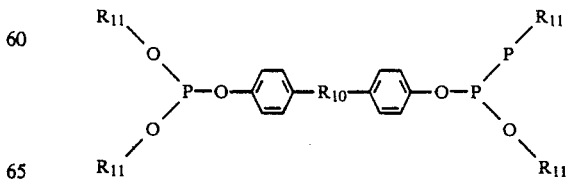

wherein $R_{10}$ is selected from a direct bond, O, CO, S, $SO_2$, $C(CH_3)_2$, and $R_{11}$ is selected from the following:

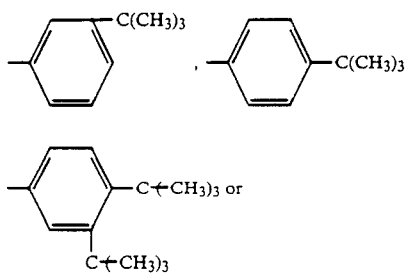

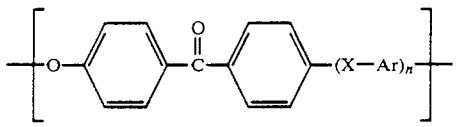

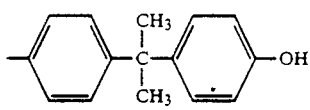

The organic acids useful for the purposes of the instant invention have dissociation constants in the range of $1.10^{-1}$ to $1.10^{-10}$ (water, 25° C.), preferably in the range of $1.10^{-5}$ to $1.10^{-4}$. Typical acids that can be used are formic, acetic, propionic, n-butyric, iso-butyric, n-valeric, iso-valeric, n-caproic, iso-caproic, β-chlorobutyric, γ-chlorobutyric, trans-cinnamic, o-, m-, and p-chlorocinnamic, benzoic, phenylacetic, α-phenylpropionic, β-phenylpropionic, γ-phenylbutyric, oxalic, fumaric, succinic, adipic, citric, and the like. Acetic, n-butyric, valeric, and iso-valeric acids are preferred. Acidic acid is most preferred.

The crystalline poly(aryl ether ketones) which are suitable for use herein can be generically characterized as containing repeating units of one or more of the following formulae:

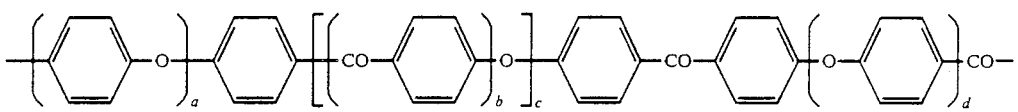

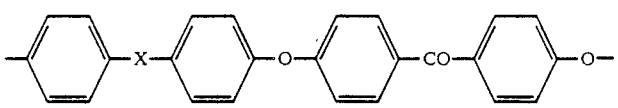

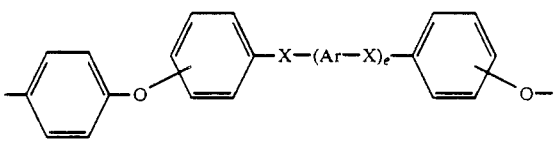

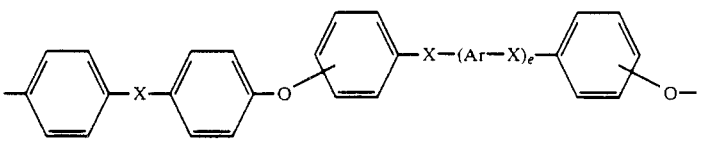

wherein Ar is independently a divalent aromatic radical such as phenylene, biphenylene, naphthylene, and the like; X is independently O,

or a direct bond and n is an integer of from 0 to 3; b, c, d and e are 0 to 1 and a is an integer of 1 to 4 and preferably d is 0 when b is 1.

Preferred poly(aryl ether ketone)s include those having repeating units of the formula:

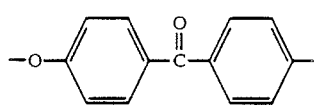

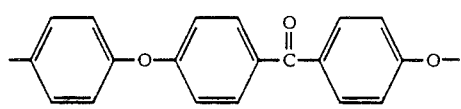

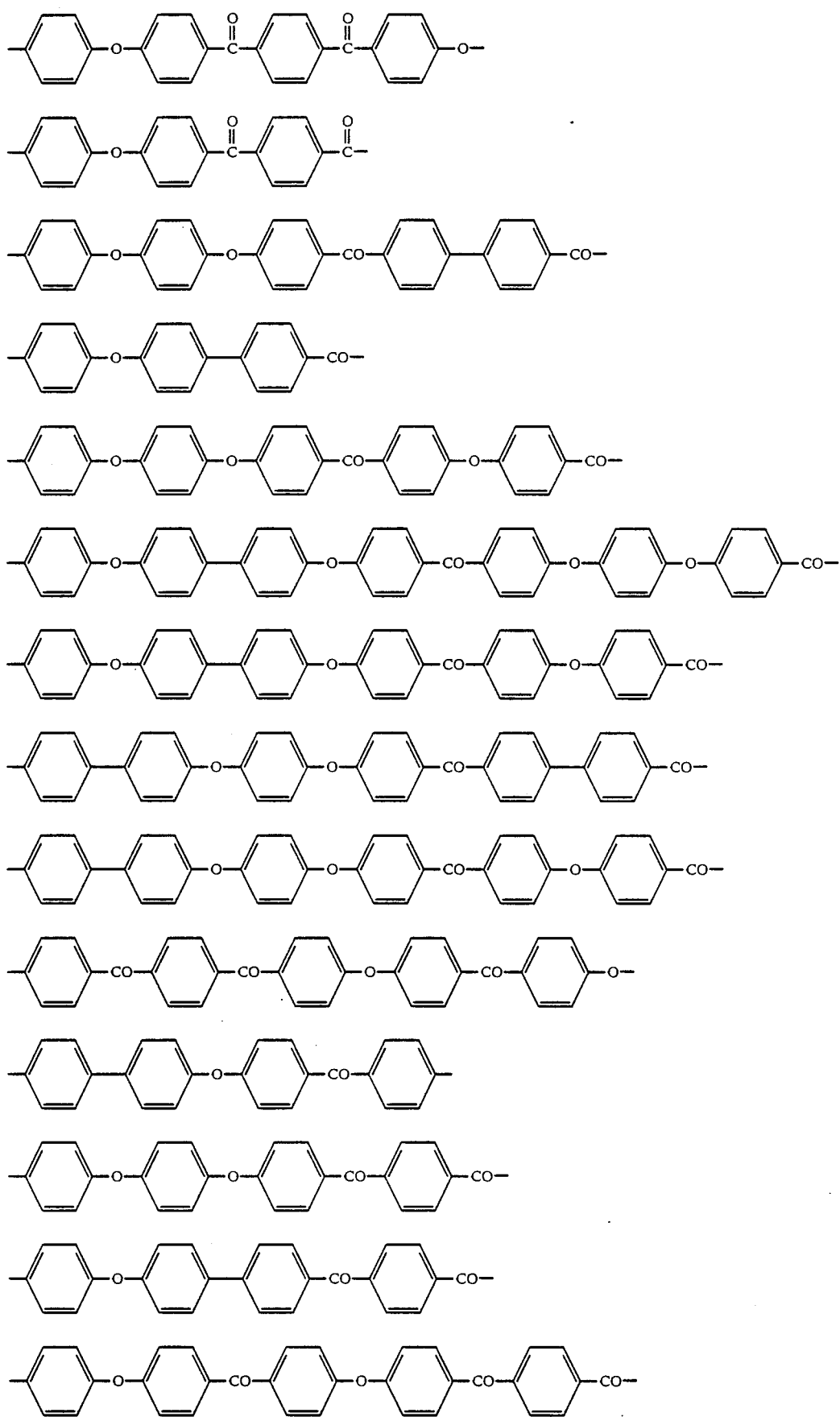

These poly(aryl ketone)s are prepared by methods well known in the art. One such method comprises heating a substantially equimolar mixture of at least one bisphenol and at least one dihalobenzoid compound or at least one halophenol compound. Preferred bisphenols in such a process include:
hydroquinone,
4,4'-dihydroxybenzophenone,
4,4,'-dihydroxybiphenyl, and
4,4,'-dihydroxydiphenyl ether.

Preferred halophenol and dihalobenzoid compounds include:
4-(4'-chlorobenzoyl)phenol,
4-(4'-fluorobenzoyl)phenol,
4,4'-difluorobenzophenone,
4,4'-dichlorobenzophenone,
4-chloro-4'-fluorobenzophenone,

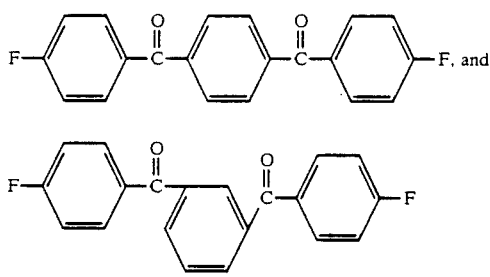

The poly(aryl ether ketone)s may be produced by the process as described in, for example, U.S. Pat. No. 4,176,222. This process comprises heating in the temperature range of 100° to 400° C.,
(i) a substantially equimolar mixture of
 (a) at least one bisphenol and
 (b) at least one dihalobenzenoid compound, and/or
(ii) at least one halophenol, in which in the dihalobenzenoid compound or halophenol, the halogen atoms are activated by —CO— groups ortho or para thereto, with a mixture of sodium carbonate or bicarbonate and a second alkali metal carbonate or bicarbonate, the alkali metal of said second alkali metal carbonate or bicarbonate having a higher atomic number than that of sodium, the amount of said second alkali metal carbonate or bicarbonate being such that there are 0.001 to 0.2 gram atoms of said alkali metal of higher atomic number per gram atom of sodium, the total amount of alkali metal carbonate or bicarbonate being such that there is at least one alkali metal atom for each phenol group present, and thereafter separating the polymer from the alkali metal halide.

Also, poly(aryl ether ketone)s such as those containing repeating units of the formula:

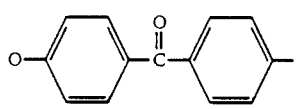

may be produced by Friedel-Craft reactions utilizing hydrogen fluoride-boron trifluoride catalysts as described, for example, in U.S. Pat. 3,953,400.

Additionally, poly(aryl ether ketones) of the following formula:

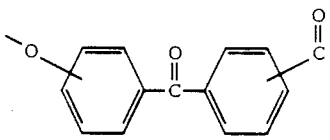

may be prepared by Friedel-Craft reactions using a boron fluoride-hydrogen fluoride catalyst as described in, for example, U.S. Pat. Nos. 3,441,538; 3,442,857 and 3,516,966.

The polyketones may also be prepared according to the process as described in, for example, U.S. Defensive Publication T 103,703 and U.S. Pat. No. 4,396,755. In such processes, reactants such as
(a) an aromatic monocarboxylic acid,
(b) a mixture of at least one aromatic dicarboxylic acid, and an aromatic hydrocarbon, and
(c) combinations of (a) and (b) are reacted in the presence of a fluoroalkane sulphonic acid, particularly trifluoromethane sulphonic acid.

Additionally, poly(aryl ketone)s of the following formulae:

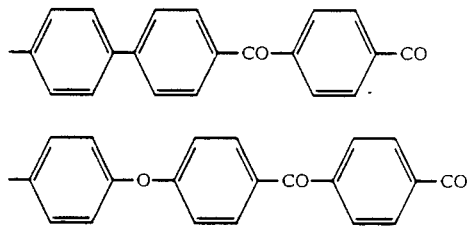

may be prepared according to the process as described in, for example, U.S. Pat. No. 4,398,020. In such a process,
(a) a mixture of substantially equimolar amounts of
 (i) at least one aromatic diacyl halide of the formula:

where —Ar'— is a divalent aromatic radical, Y is halogen and COY is an aromatically bound acyl halide group, which diacyl halide is polymerizable with at least one aromatic compound of (a)(ii), and
 (ii) at least one aromatic compound of the formula:

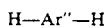

wherein —Ar"— is a divalent aromatic radical and H is an aromatically bound hydrogen atom, which compound is polymerizable with at least one diacyl halide of (a)(i), or
(b) at least one aromatic monoacyl halide of the formula:

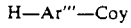

where —Ar'''— is a divalent aromatic radical, H is an aromatically bound hydrogen atom, and Y and COY are as defined above, which monoacyl halide is self-polymerizable, or (c) a combination of (a) and (b) are reacted in the presence of a fluoroalkane sulphonic acid.

The term poly(aryl ether ketone) as used herein is meant to include homopolymers, copolymers, terpolymers, graft and block copolymers, and the like.

The poly(aryl ether ketones) have a reduced viscosity of at least about 0.4 to about 5.0 dl/g, as measured in concentrated sulphuric acid at 25° C.

The compositions of this invention may include mineral fillers such as carbonates including chalk, calcite and dolomite; silicates including mica, talc, wollastonite, silicon dioxide; glass spheres; glass powders; aluminum; clay; quartz; and the like. Also, reinforcing fibers such as fiberglass, carbon fibers, and the like may be used. The compositions may also include additives such as titanium dioxide; thermal stabilizers, ultraviolet light stabilizers, plasticizers, and the like.

The compositions of this invention may be fabricated into any desired shape, i.e., moldings, coatings, films, or fibers. They are particularly desirable for use as electrical insulation for electrical conductors.

EXAMPLES

The following examples serve to give specific illustrations of the practice of this invention but they are not intended in any way to limit the scope of this invention.

The stability of the polymers was determined by measuring their melt-flows, $MF_1$ and $MF_2$ at 400° C. The description of the test follows.

The Melt-Flow Test

A convenient measure of melt viscosity is the melt-flow as described in the ASTM test procedure D-1238-85. The test measures the rate of polymer flow through a 0.1822 inch diameter by 0.315 inch long die as grams of polymer extruded per ten minute period. The melt-flow is thus inversely proportional to the polymer melt viscosity under the conditions of the test. That is, lower viscosity resins yield higher melt-flow rates. As adapted for use with PAEKs, the barrel temperature setting was 400° C. and the polymer was extruded under the action of an applied weight of 2160 grams which resulted in a pressure of 44 psi. The flow rate measured after ten minutes of preheat was designated as $MF_1$. Likewise, the flow rate measured after 30 minutes of preheat was designated $MF_2$. The melt-flow ratio (MFR) defined as $MF_2/MF_1$, is an indication of the change in melt viscosity between 10 and 30 minutes of preheating. A melt-flow ratio less than one is indicative of an increase in melt viscosity with time. As previously mentioned, an MFR of 1.0 and an increase in the melt-flow rate ($MF_1$ or $MF_2$) as a result of the stabilizing treatment are highly desirable.

Materials Used (a) Stabilizers

Mark 2112 - tris(2,4-di-tert-butyl phenyl) phosphite having the formula:

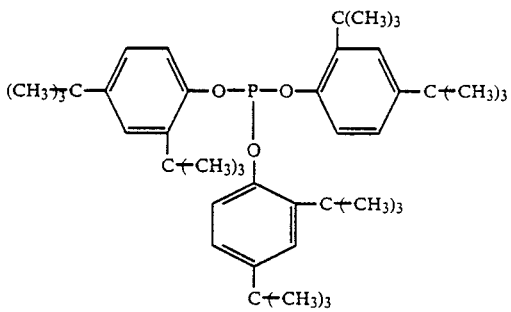

Sandostab-P-EPO - tetrakis(2,4-di-tert-butyl phenyl)-4,4,-biphenylene diphosphonite having the formula:

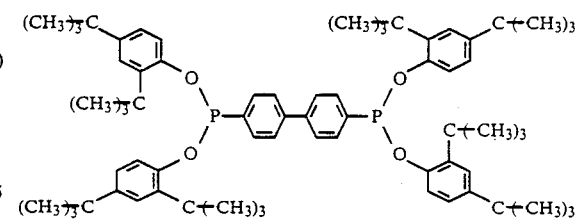

(b) Polymers

Poly(aryl ether ketone) PAEK-I, was a block copolymer prepared as described by R. A. Clendinning, et al., in U.S. Patent Application Ser. No. 039,310; titled "Poly(aryl ether ketone) Block Copolymers", filed Apr. 16, 1987, commonly assigned. It was prepared via the reaction of diphenyl ether with terephthaloyl chloride and p-fluorobenzoyl chloride, followed by reaction with 4,4'-difluorobenzophenone and hydroquinone. It had the structure shown:

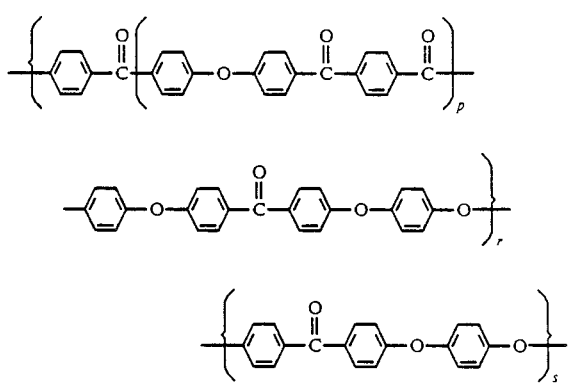

where p is one or greater, and r and s respectively vary within the range of from 1 to 99 and from 99 to 1. The reduced viscosities of the polymer as measured in 96 percent sulfuric acid, at 25° C. at a concentration of 1 g per 100 mls, were in the range of 0.7 to 1.2 dl/g.

EXAMPLES 1 and 2 and Control A

Granules of PAEK-I that had been extracted and dried were found to have the following analysis:
Na < 100 ppm
K < 10 ppm
Li < 25 ppm
Diphenyl sulfone (DPS) < 5000 ppm RV=0.95 as measured in 96 percent H₂SO₄ at 1 weight percent concentration and 25° C.

The resin was compounded with no additives, and with the addition of 1 percent Mark 2112 and 1 percent Sandostab P-EPQ in a one-inch single screw extruder (L/D=36:1) manufactured by Killion Extruders, Inc. The barrel was equipped with two devolatilization ports. The first was open to the atmosphere while the second was under 25 inches of vacuum. The screw speed was approximately 70 RPM and the melt temperature during extrusion was between 370° and 400° C. Resin was extruded at a rate of approximately 4 lbs/hr and chopped into pellets which were measured for melt-flow at 400° C. and 44 psi. The results are shown in Table I. It can be seen that the phosphonite (Sandostab P-EPQ) is much less effective than the phosphite (Mark 2112) at stabilizing the PAEK. In fact, after ten minutes in the melt at 400° C., the phosphonite actually decreases the flow of the PAEK compared to an increase of 156 percent with the addition of the phosphite. It is thus seen that certain organic phosphorous compounds (phosphites) are much more effective than others (phosphonites) at stabilizing PAEKs. It may even be stated that phosphonites are not at all effective at stabilizing the melt viscosities of PAEKs as will also become apparent in subsequent Examples.

EXAMPLES 3 and 4 and Control B

Granules of PAEK-I that had been extracted and dried were found to have an RV of 0.96 dl/g as measured in 96 percent H₂SO₄ at 1 weight percent concentration and 25° C. The granules were compounded with no additives and with the addition of 1 percent acetic acid and 1 percent formic acid using the technique of the previous example. The resulting pellets were tested for melt-flow and the results are given in Table II. The results show that the addition of organic acids alone resulted, at best, in only a small improvement in the melt-flow of the PAEK. The addition of formic acid to the melt, contrary to the data of U.S. Pat. No. 3,767,620, resulted in gellation.

EXAMPLES 5,6,7,8,9, and 10 and Control C

Granules of PAEK-I that had been extracted and dried were found to have an RV of 0.95 dl/g as measured in 96 percent H₂SO₄ at 1 weight percent concentration and 25° C. The granules were compounded with various combinations of stabilizers following the technique of Examples 1 and 2. The various compositions are shown in Table III. The resulting pellets were tested for melt-flow and the results are given in Table III.

The results of examples 5 to 10 point out the following:
1) While the phosphite significantly improved both the $MF_1$ and $MF_2$ of the PAEK, the addition of the phosphonite resulted in a significant reduction in the melt-flow and thus had a detrimental effect.
2) The addition of either acid alone had a significantly detrimental effect on the melt flows.
3) The addition of either organic phosphorous compound with either organic acid resulted in a significant improvement in the melt-flow of the PAEK.
4) The magnitude of the improvement in melt-flow was significantly greater when the phosphite was used in conjunction with the organic acid compared with the use of the phosphite alone. Thus it is believed that the two have a synergistic effect when used in combination.

EXAMPLES 11,12,13,14,15, and 16 and Control D

Granules of PAEK-I that had been extracted and dried were found to have the following analysis:
Na<100 ppm
K<10 ppm
Li<25 ppm
DPS<5000 ppm
RV=0.84 as measured in 96 percent H₂SO₄ at 1 weight percent concentration and 25° C.

The resin was compounded with no additives and with the various additives shown in Table IV using the procedure of Examples 5 through 10. The resulting pellets were measured for melt-flow and the results are given in Table IV.

The results of Examples 11 to 16 point out the following:
1) While the phosphite had little effect on the melt-flow of the PAEK, the phosphonite drastically reduced it and thus had a detrimental effect.
2) Acetic acid had a slightly detrimental effect while oxalic acid had a major detrimental effect on the melt-flow of the PAEK.
3) The combination of either the phosphonite or the phosphite with either acid significantly improved the $MF_1$ and $MF_2$ of the PAEK over the unstabilized control.

TABLE I

|  | Control A | Example 1 | Example 2 |
|---|---|---|---|
| Phosphite (Mark 2112) | — | — | 1% |
| Phosphonite (Sandostab P-EPQ) | — | 1% | — |
| Melt-Flow (dg/min) |  |  |  |
| MF₁ | 4.6 | 4.3 | 11.8 |
| Percentage Increase of MF₁ Relative to Control | — | −6 | 156 |
| MF₂ | 3.7 | 4.7 | 13.0 |
| Percentage Increase of MF₂ Relative to Control | — | 27 | 251 |
| MFR | 0.8 | 1.1 | 1.1 |

TABLE II

|  | Control B | Example 3 | Example 4 |
|---|---|---|---|
| Acetic Acid | — | 1% | — |
| Formic Acid | — | — | 1% |
| Melt-Flow (dg/min) |  |  |  |
| MF₁ | 3.7 | 4.2 | 0 |
| Percentage Increase of MF₁ Relative to Control | — | 13 | −100 |
| MF₂ | 2.6 | 3.4 | 0 |
| Percentage Increase of MF₂ Relative to Control | — | 24 | −100 |
| MFR | 0.7 | 0.8 | — |

TABLE III

| Example | Stabilizer | MF$_1$ (dl/min) | Percentage Increase of MF$_1$ Relative to Control | MF$_2$ (dl/min) | Percentage Increase of MF$_2$ Relative to Control | MFR |
|---|---|---|---|---|---|---|
| Control C | None | 5.7 | — | 4.6 | — | 0.8 |
| 5 | 1% Mark 2112 | 9.5 | 67 | 10.4 | 126 | 1.1 |
| 6 | 1% Sandostab P-EPQ | 3.2 | −44 | 2.2 | −52 | 0.7 |
| 7 | 1% Acetic Acid | 4.5 | −21 | 3.6 | −22 | 0.8 |
| 8 | 1% Oxalic Acid | 0.3 | −95 | 0.2 | −96 | 0.7 |
| 9 | 0.5% Mark 2112 0.5% Acetic Acid | 13.8 | 142 | 15.2 | 230 | 1.1 |
| 10 | 0.5% Sandostab P-EPQ 0.5% Oxalic Acid | 8.1 | 42 | 7.6 | 65 | 0.9 |

TABLE IV

| Example | Stabilizer | MF$_1$ (dl/min) | Percentage Increase of MF$_1$ Relative to Control | MF$_2$ (dl/min) | Percentage Increase of MF$_2$ Relative to Control | MFR |
|---|---|---|---|---|---|---|
| Control D | None | 18.0 | — | 14.4 | — | 0.8 |
| 11 | 1% Mark 2112 | 16.3 | −9 | 14.7 | 2 | 0.9 |
| 12 | 1% Sandostab P-EPQ | 5.4 | −70 | 4.3 | −70 | 0.8 |
| 13 | 1% Acetic Acid | 16.3 | −9 | 13.0 | −9 | 0.8 |
| 14 | 1% Oxalic Acid | 0.9 | −95 | 0.7 | −95 | 0.8 |
| 15 | 0.5% Mark 2112 0.5% Oxalic Acid | 26.0 | 44 | 28.6 | 99 | 1.1 |
| 16 | 0.5% Sandostab P-EPQ 0.5% Acetic Acid | 21.0 | 17 | 12.0 | 46 | 1.0 |

What is claimed is:

1. A melt-stable composition comprising (a) a poly(aryl ether ketone) (b) a stabilizing amount of a combination of (i) an aromatic phosphorous compound selected from the group consisting of aromatic phosphorus compounds of the formulae:

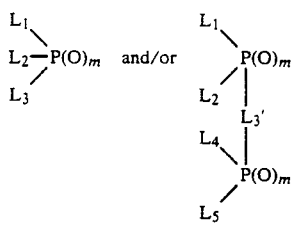

where L$_1$, L$_2$, L$_3$, L$_4$ and L$_5$ are the same or different and are independently either Ar$_1$ or Ar$_1$O, Ar$_1$ being a monovalent aromatic radical having at least six carbon atoms; L'$_3$ is Ar$_2$ or OAr$_2$O, Ar$_2$ being an arylene radical of at least six carbon atoms; and m is an integer of 0 or 1, and aromatic phosphite and/or phosphonite compounds of the formula

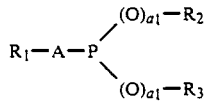

where R$_1$, R$_2$ and R$_3$ are the same or different and are substituted or unsubstituted aryl radicals containing from six to about 30 carbon atoms; a$_1$ is 0 or 1 and A is a chemical bond or an oxygen atom, with the provisos that (1) both a$_1$'s must be one when A is a chemical bond and only one a$_1$ can be zero when A is an oxygen atom; and (2) at least one of R$_1$, R$_2$ and R$_3$ must be an aromatic group; and (ii) an organic acid selected from the group consisting of formic, acetic, propronic, n-butyric, iso-butyric, n-valeric, iso-valeric, n-caproic, iso-caproic, β-chlorobutyric, γ-chlorobutyric, trans-cinnamic, o-, m-, and p-chlorocinnamic, benzoic, phenylacetic, α-phenylpropionic, β-phenylpropionic, γ-phenylbutyric, oxalic, fumaric, succinic, adipic, and citric acids.

2. A composition as defined in claim 1 where the poly(aryl ether ketone) comprises repeating units of one or more of the following formulae:

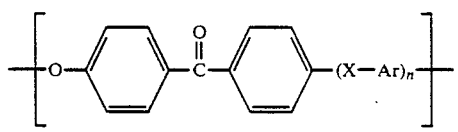

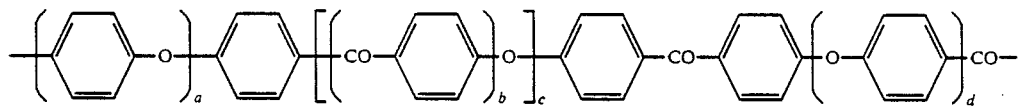

-continued
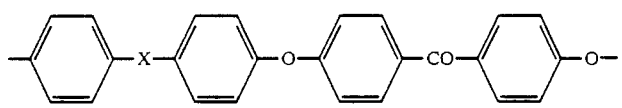
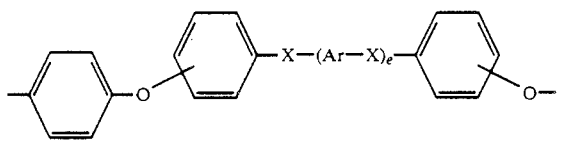
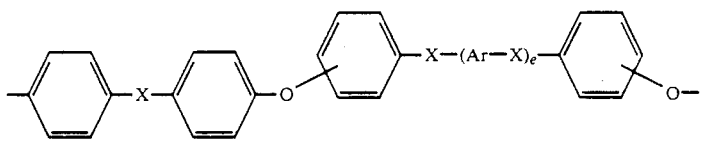
wherein Ar is independently a divalent aromatic radical such as phenylene, biphenylene, naphthylene; X is independently O,
or a direct bond and n is an integer of from 0 to 3; b, c, d and e are 0 to 1 and a is an integer of 1 to 4.
3. A composition as defined in claim 1 where the poly(aryl ether ketone) includes repeating units of one or more of the following formulae:
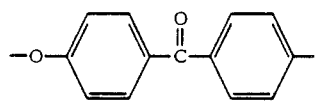
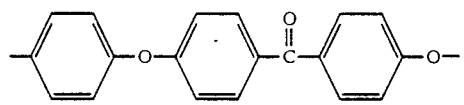
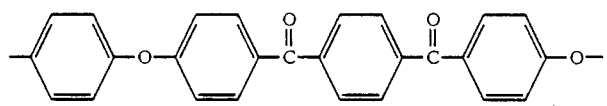
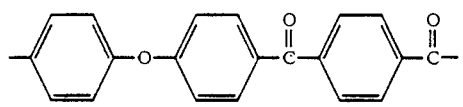
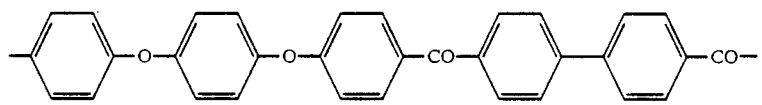
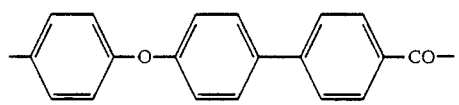
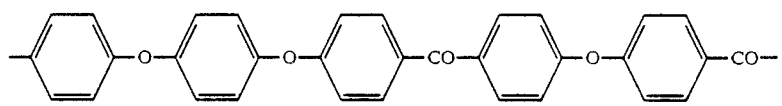
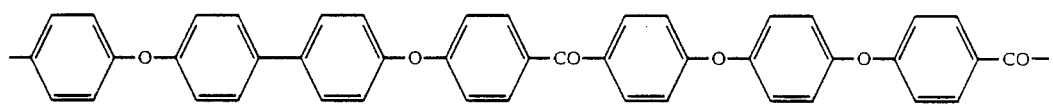

-continued

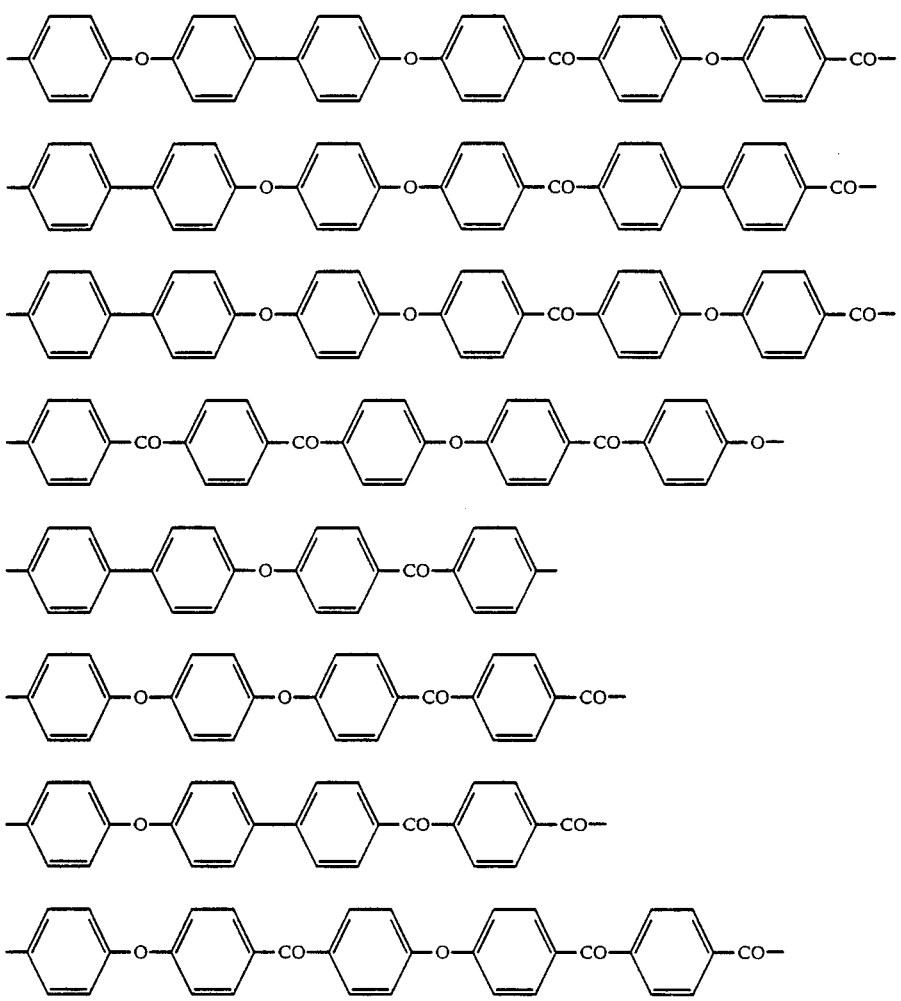

4. A composition as defined in claim 1 where the poly(aryl ether ketone) is of the formula

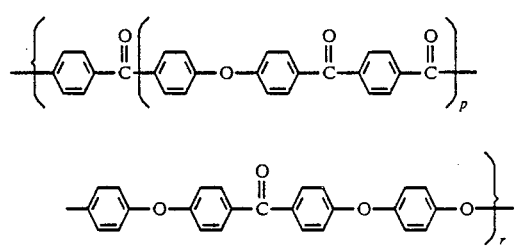

where p is one or greater, and r and s respectively, vary within the range of from 1 to 99 to 99 to 1.

5. A composition as defined in claim 1 where the aromatic phosphorus compound is an aromatic phosphite and/or an aromatic phosphonite.

6. A composition as defined in claim 1 where the alkyl radicals are selected from the group of octyl, nonyl, decyl and dodecyl.

7. A composition as defined in claim 1 wherein the aryl radicals are of the formula

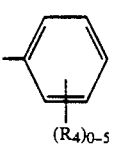

where the groups $R_4$ are independently an alkyl group of 1 to about six carbon atoms, or a halogen atom.

8. A composition as defined in claim 1 wherein the aryl radicals are selected from the group of

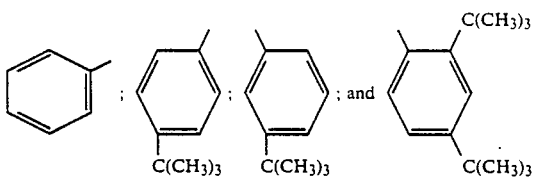

9. A composition as defined in claim 5 where the aromatic phosphite is of the formula

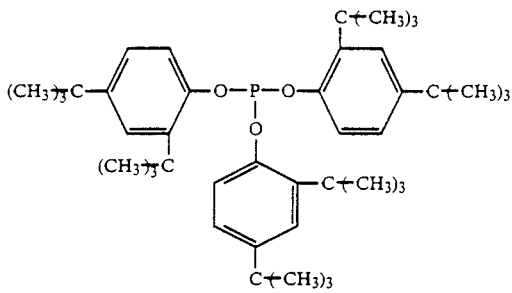

10. A composition as defined in claim 1 where the aromatic phosphorus compound is an aromatic diphosphite and/or an aromatic diphosphite.

11. A composition as defined in claim 10 where the diphosphonite and/or diphosphonite have the formula.

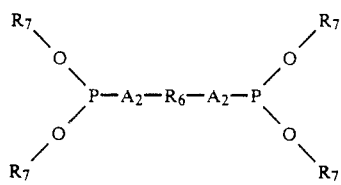

wherein $A_2$ is an oxygen atom or a chemical bond; $R_6$ is an aromatic radical and the $R_7$ groups are independently aliphatic or aromatic radicals.

12. A composition as defined in claim 10 where the diphosphite and/or diphosphonite have the formula

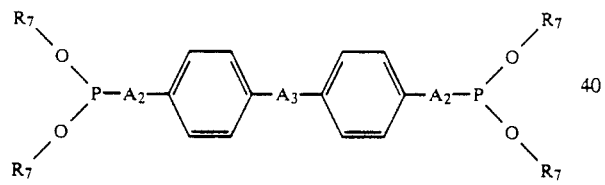

wherein $A_2$ is as previously defined; $A_3$ is a chemical bond, S, $SO_2$, O, CO, alkylene or alkylidene having from 1 to about 8 carbon atoms; and the $R_7$ groups are independently aliphatic radicals having from 1 to about 25 carbon atoms, or substituted or unsubstituted aromatic radicals having from 6 to about 30 carbon atoms.

13. A composition as defined in claim 12 where the $R_7$ groups are independently selected from methyl; ethyl; isopropyl; butyl; isobutyl; tert.-butyl; phenyl; alkyl or aryl substituted phenyl wherein the alkyl group may contain from 1 to about 25 carbon atoms and may be linear or branched, and wherein the aryl group may contain from 6 to about 30 carbon atoms; halogen substituted phenyl; hydroxy-substituted $C_6$ to $C_{30}$ aryl; naphthyl; and $C_1$ to $C_{25}$ alkyl, $C_6$ to $C_{30}$ aryl or halogen substituted naphthyl.

14. A composition as defined in claim 12 wherein the $R_7$ groups are of the formulae

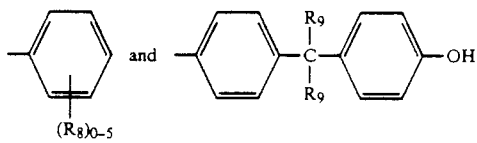

wherein $R_8$ and $R_9$ are independently alkyl groups of 1 to about 6 carbon atoms.

15. A composition as defined in claim 14 where the $R_7$ groups are selected from

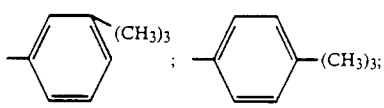

16. A composition as defined in claim 10 where the aromatic diphosphonite is of the formula 17. A composition as defined in claim 1 wherein the phosphorous compound and organic acid are used in amounts of from about 0.25 to about 3.0 weight percent based on the weight of (a).

18. Molded articles, films and fibers made from the composition of claim 1.

19. A composition as defined in claim 9 wherein the melt-stable composition is nonglass-containing.

20. A composition as defined in claim 19 wherein the organic acid is selected from the group of acetic and oxalic acids.

21. A composition as defined in claim 12 wherein the melt-stable composition is nonglass-containing.

22. A composition as defined in claim 21 wherein the organic acid is selected from the group of acetic and oxalic acids.

* * * * *